(12) United States Patent
Kyon

(10) Patent No.: US 11,471,994 B2
(45) Date of Patent: Oct. 18, 2022

(54) LENS BLOCKER

(71) Applicant: HUVITZ CO., LTD., Anyang-si (KR)

(72) Inventor: Byung Woo Kyon, Gunpo-si (KR)

(73) Assignee: HUVITZ CO., LTD., Anyang-si (KR)

( * ) Notice: Subject to any disclaimer, the term of this patent is extended or adjusted under 35 U.S.C. 154(b) by 300 days.

(21) Appl. No.: 16/766,373

(22) PCT Filed: Nov. 28, 2018

(86) PCT No.: PCT/KR2018/014876
§ 371 (c)(1),
(2) Date: May 22, 2020

(87) PCT Pub. No.: WO2019/107941
PCT Pub. Date: Jun. 6, 2019

(65) Prior Publication Data
US 2020/0361050 A1     Nov. 19, 2020

(30) Foreign Application Priority Data
Nov. 29, 2017 (KR) ........................ 10-2017-0161470

(51) Int. Cl.
*B24B 13/005* (2006.01)
*B24B 9/14* (2006.01)
*G02C 7/02* (2006.01)

(52) U.S. Cl.
CPC ............ *B24B 13/005* (2013.01); *B24B 9/146* (2013.01); *B24B 13/0055* (2013.01); *G02C 7/024* (2013.01)

(58) Field of Classification Search
CPC ........ G02C 7/024; G02C 9/00; B24B 13/005; B24B 13/0055; B24B 9/146
See application file for complete search history.

(56) References Cited

U.S. PATENT DOCUMENTS 5,721,644 A * 2/1998 Murray ................. B24B 13/005
451/6
2004/0219005 A1   11/2004  Tanaka
2007/0226991 A1   10/2007  Matsuyama
2008/0160889 A1    7/2008  Song
(Continued)

FOREIGN PATENT DOCUMENTS

EP        2669047      12/2013
JP      2004-333573    11/2004
(Continued)

OTHER PUBLICATIONS

KIPO, International Search Report of PCT/KR2018/014876 dated Mar. 11, 2019.

*Primary Examiner* — Jordan M Schwartz
(74) *Attorney, Agent, or Firm* — Lex IP Meister, PLLC

(57) ABSTRACT

A lens blocker includes a drive cam having a blocker arm guide groove; a blocker arm coupled to the drive cam to be movable up and down along the drive cam or to be rotatable about the drive cam, and having a blocker arm guide formed at one end thereof, wherein the blocker arm guide is inserted into the blocker arm guide groove of the drive cam and moves along the blocker arm guide groove; a leap block mount (50), to which a leap block to be attached to a blank lens is mounted and which is coupled to the blocker arm; a blocker arm base moving the blocker arm up and down along the drive cam; and a lens mount onto which the blank lens, is mounted.

5 Claims, 4 Drawing Sheets

(56) References Cited

U.S. PATENT DOCUMENTS

2010/0228375 A1* 9/2010 Brechemier ............ B24B 9/146
   700/110
2012/0272515 A1* 11/2012 Brechemier ............ B24B 9/146
   29/700
2014/0038500 A1* 2/2014 Brechemier ............ G02B 7/023
   451/390

FOREIGN PATENT DOCUMENTS

| KR | 20070099433 | 10/2007 |
| KR | 10-0806053 | 2/2008 |
| KR | 20130113766 | 10/2013 |
| KR | 101327238 | 11/2013 |
| KR | 20130135175 | 12/2013 |

* cited by examiner

A  B  C

LENS BLOCKER

FIELD OF THE DISCLOSURE

The present invention relates to a lens blocker, and more particularly, to a lens blocker for attaching a leap block to a machining center of a blank lens to be machined in order to craft an eyeglass lens.

BACKGROUND

Eyeglasses are made by fitting lenses for correcting vision into an eyeglass frame selected by a consumer. In order to manufacture eyeglasses, it is necessary to machine the outer shape of lenses that are sold in a round shape (typically, called blank lenses) so as to conform to an eyeglass frame, and to this end, such apparatus as a tracer, a lens blocker, a lens machining tool, and so on is used. The tracer is an apparatus for reading the shape of an eyeglass frame, and the lens machining tool is an apparatus for machining blank lenses into the shape of the eyeglass frame. The lens blocker is an apparatus for attaching a leap block (a connection block) to a machining reference point of the blank lens, and once the leap block is attached to the blank lens, the blank lens is mounted to a clamp of the lens machining tool through the leap block, and then is machined into the shape of the eyeglass frame (see, Korean patent Laid Open No. 10-2003-0032209).

FIG. 1 is a view showing a coupled state of a blank lens and a leap block, and the leap block 14 is attached to one surface of the blank lens 10 by way of a blocking pad 12, and a clamp of a lens machining tool is fastened to the leap block 14, as shown in FIG. 1. An operation for attaching the leap block 14 onto the blank lens 10 using the blocking pad 12 consisting of rubber or the like containing an adhesive component is referred to as blocking. The leap block may be attached to the optical center of the blank lens 10 or to the center of the shape of the eyeglass frame (hereinafter, referred to as a machining center), depending on methods of machining the blank lens 10.

FIG. 2 is a view showing a leap block mount of a typical lens blocker. As shown in FIG. 2, the typical lens blocker has a leap block 14 mounted thereto, and comprises a blocker arm 20 for moving the mounted leap block 14 to the attachment position for the blank lens and a lens mount 22 for stably supporting the blank lens to which the leap block 14 is to be attached (see, Korean patent No. 10-1327238). The leap block 14 is mounted to a lower portion of the blocker arm 20, and the blank lens is located on the lens mount 22. A user mounts the leap block 14 to the lower portion of the blocker arm 20, rotates the blocker arm 20 to the direction of the lens mount 22 and then lowers the blocker arm 20, so that the leap block 14 mounted to the lower portion of the blocker arm 20 is attached to the blank lens located on the lens mount 22. In this way, once the leap block 14 is attached to the blank lens, the blocker arm 20 is again raised and rotated to return to the initial position.

In such a typical lens blocker, since the fastening portion for the leap block 14 of the blocker arm 20 is located on the bottom surface of the blocker arm 20, the user needs to fit the leap block 14 in the upward direction from below. Accordingly, because the user cannot visually check the fastening portion for the leap block 14 with his or her own eyes, there is a problem of being difficult to mount the leap block 14. In order to resolve such a problem, a method is used in which the fastening portion for the leap block 14 of the blocker arm 20 is rotated to the upward direction, so that the user mounts the leap block 14 while visually checking the fastening portion for the leap block 14 with his or her own eyes. However, even in this case, there is an inconvenience in that the user needs to manually change the direction of the fastening portion for the leap block 14, and there is also a concern that the lens may be unstably fastened because of the user's mistakes or the clearance in the rotating portions. Further, for a typical lens blocker, the user himself or herself rotates and lowers the blocker arm 20, which is inconvenient, and there is a drawback of requiring to be skilled in operating the lens blocker.

SUMMARY OF THE INVENTION

It is an object of the present invention to provide a lens blocker capable of conveniently and stably attaching a leap block mounted on a blocker arm to a blank lens with a single operation.

It is another object of the present invention to provide a lens blocker capable of conveniently and easily mounting a leap block on a blocker arm by a user while visually checking with his or her own eyes.

In order to achieve the objects above, the present invention provides a lens blocker comprising: a drive cam 30 of a cylindrical shape having a blocker arm guide groove 32 formed therein; a blocker arm 40 coupled to the drive cam 30 to be movable up and down along the drive cam 30 or to be rotatable about the drive cam 30, and having a blocker arm guide 42 formed at one end thereof, wherein the blocker arm guide 42 is inserted into the blocker arm guide groove 32 of the drive cam 30 and moves along the blocker arm guide groove 32, so as to cause the blocker arm 40 to move up and down along the drive cam 30 or to rotate about the drive cam 30; a leap block mount 50, on which a leap block to be attached to a blank lens is mounted and which is coupled to the blocker arm 40; a blocker arm base 60 configured to move the blocker arm 40 up and down along the drive cam 30; and a lens mount 70 onto which the blank lens, to which the leap block is to be attached, is mounted.

Here, the drive cam 30 further comprises a leap block mount guide groove 34 formed therein, and the leap block mount 50 comprises: a block rotation portion 52 on which the leap block to be attached to the blank lens is mounted and which is coupled to the other end of the blocker arm 40 so as to be rotatable up and down; a block rotation shaft 54, one end of which is fixedly coupled to the block rotation portion 52 and which extends through the blocker arm 40; and a leap block mount guide 56 coupled to and spaced by a predetermined distance from the center of the other end of the block rotation shaft 54, and configured to be inserted into the leap block mount guide groove 34 of the drive cam 30 so as to move along the leap block mount guide groove 34.

The lens blocker in accordance with the present invention allows the user to conveniently and easily mount the leap block to the blocker arm while visually checking with his or her own eyes, as well as to conveniently and stably attach the leap block mounted on the blocker arm to the blank lens with a single operation.

DETAILED DESCRIPTION OF THE PREFERRED EMBODIMENTS

Hereinafter, the present invention will be described in greater detail with reference to the accompanying drawings. In the present disclosure, unless otherwise specified, a downward direction indicates a direction in which a leap block is attached to a blank lens, an upward direction indicates a direction in which a blocker arm is spaced from the blank lens, and left and right directions indicate the left and right directions, respectively, on the basis of the drawings.

Figure 1:
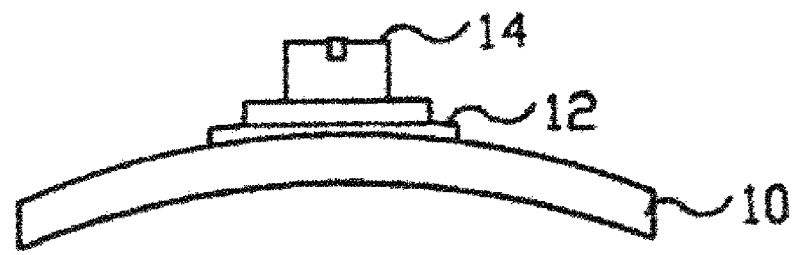
FIG. 1 is a view showing a coupled state of a blank lens and a leap block.
Figure 2:
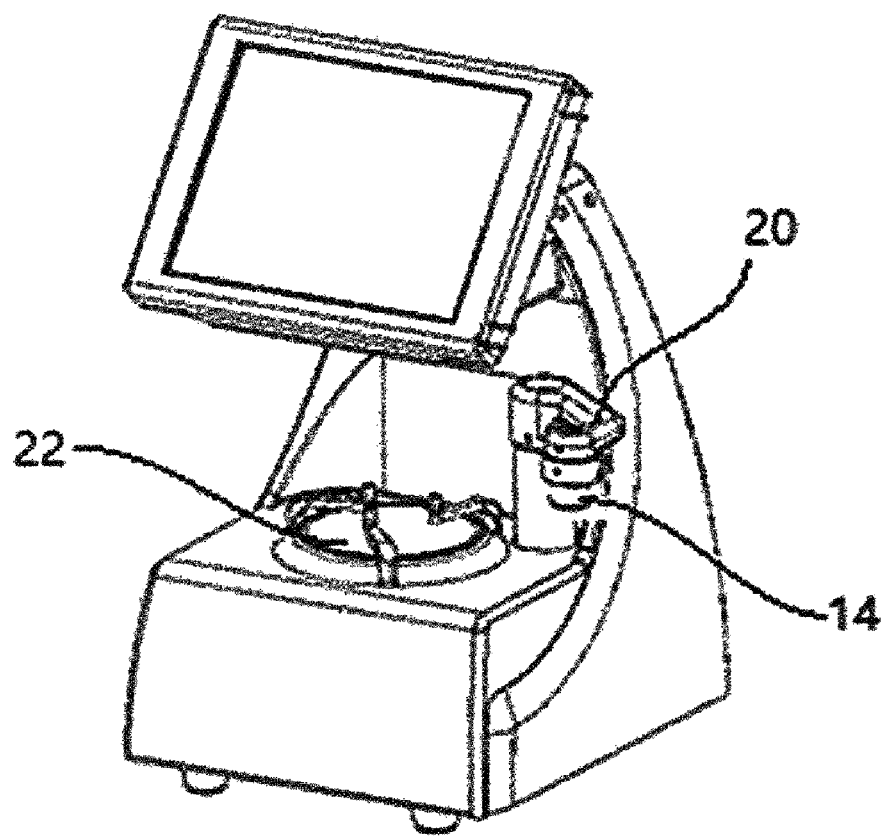
FIG. 2 is a view showing a leap block mount of a typical lens blocker.
Figure 3:
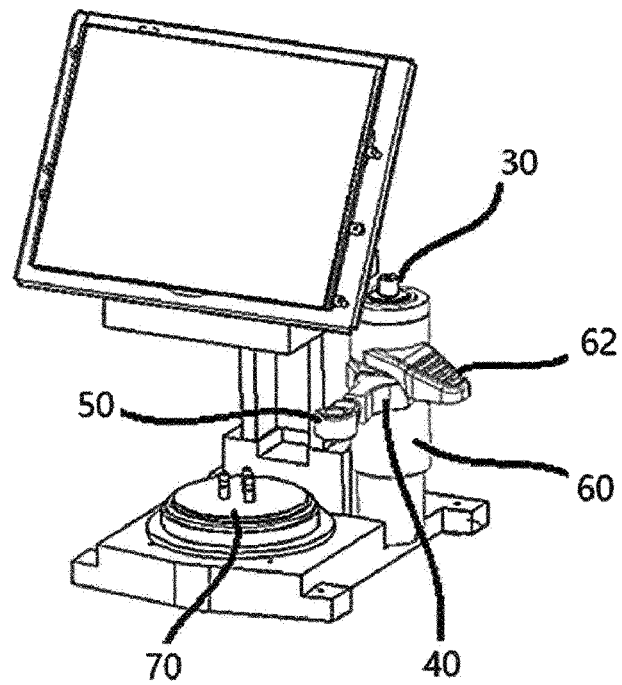
FIG. 3 is a view showing an overall structure of a lens blocker in accordance with an embodiment of the present invention.
Figure 4:
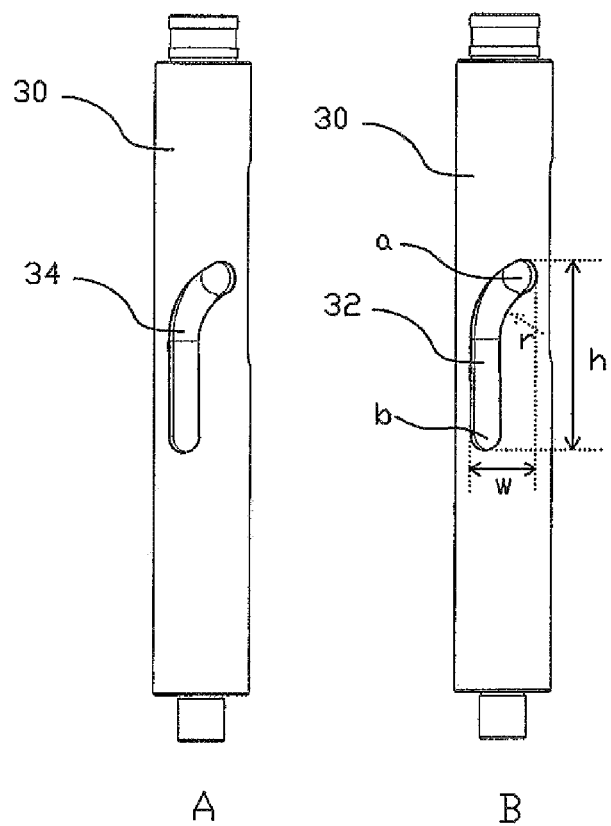
FIG. 4 is a front view (A) and a rear view (B) of a drive cam used in a lens blocker in accordance with the present invention.

FIG. 3 is a view showing an overall structure of a lens blocker in accordance with an embodiment of the present invention. As shown in FIG. 3, the lens blocker in accordance with the present invention comprises a drive cam 30, a blocker arm 40, a leap block mount 50, a blocker arm base 60, and a lens mount 70. The lens mount 70 is a typical apparatus on which a blank lens to which a leap block is to be attached is mounted, and may comprise, for example, three pedestals spaced apart from one another at the same angle and distance, so as to stably support the blank lens. FIG. 4 is a front view (A) and a rear view (B) of the drive cam used in the lens blocker in accordance with the present invention, and FIG. 5 is a cross-sectional view showing the structure of the drive cam 30, the blocker arm 40, the leap block mount 50, and the blocker arm base 60 used in the lens blocker according to the present invention.

As shown in FIGS. 3 and 4, the drive cam 30 is of a cylindrical shape having a blocker arm guide groove 32 formed therein, and the drive cam 30 may further comprise a leap block mount guide groove 34 formed therein. The blocker arm guide groove 32 serves to guide an up and down movement and a rotational movement of the blocker arm 40, and the leap block mount guide groove 34 serves to guide a rotational movement of the leap block mount 50. The blocker arm guide groove 32 is formed at one end of the drive cam 30 (e.g., in the rear surface of the drive cam 30), in the shape a circular arc having a height h, a width w, and a curvature r that are predetermined, and the leap block mount guide groove 34 is formed at the other end of the drive cam 30 (e.g., in the front surface of the drive cam 30) in the form of a circular arc with a height, a width, and a curvature that are predetermined.

Figure 5:
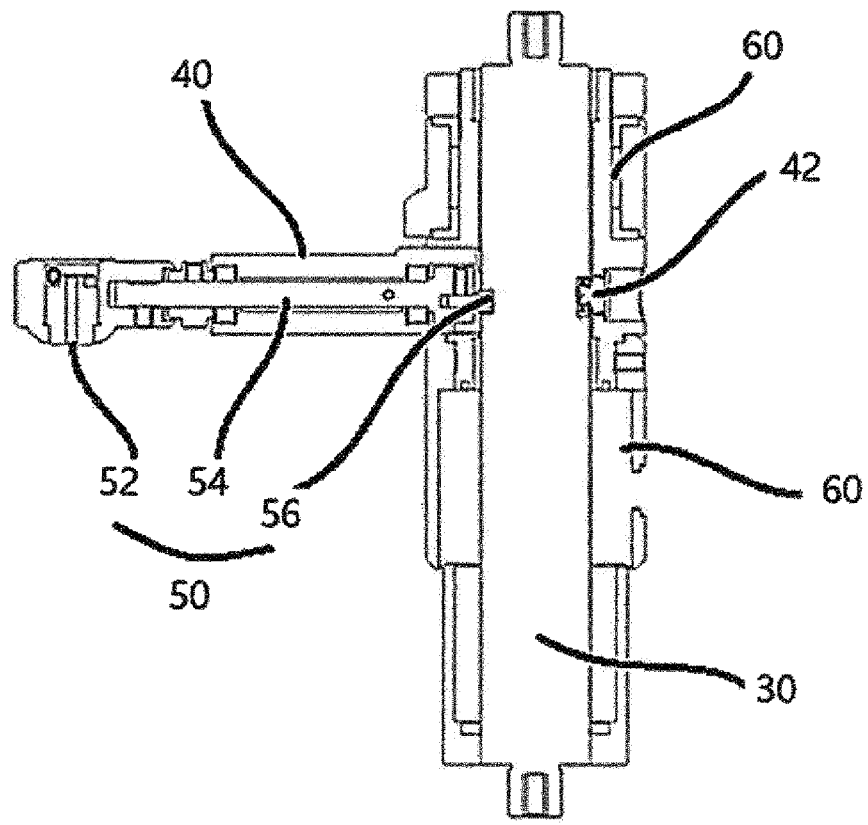
FIG. 5 is a cross-sectional view showing the structure of a drive cam 30, a blocker arm 40, a leap block mount 50, and a blocker arm base 60 used in a lens blocker according to the present invention.

As shown in FIGS. 3 to 5, one end of the blocker arm 40 is coupled to the drive cam 30 so as to be slidably movable up and down and be rotatable left and right. For example, the one end of the blocker arm 40 has a structure into which the drive cam 30 of a cylindrical shape is fitted, such that the blocker arm 40 is capable of moving up and down along the drive cam 30, or of rotating around the drive cam 30. A blocker arm guide 42 is formed at the one end of the blocker arm 40, and the blocker arm guide 42 is fitted into the blocker arm guide groove 32 of the drive cam 30 and moves along the blocker arm guide groove 32. Accordingly, the blocker arm 40 moves up and down by the height h1 of the blocker arm guide groove 32, rotationally moves left and right by the width w1, and changes its rotational speed in accordance with the curvature r1. As the blocker arm guide 42 is fitted into the blocker arm guide groove 32 and moves, the blocker arm 40 moves vertically and rotates horizontally, so as to move to the attachment position for the blank lens. That is, at the initial position a, the blocker arm 40 is located and spaced by a predetermined distance to the upward direction and to the left or right direction from the blank lens, and while moving from the initial position a to the attachment position b, the blocker arm 40 moves down and rotates to the left, and stops at the attachment position b for the blank lens.

The leap block to be attached to the blanking lens is mounted on the leap block mount 50, which is coupled to the blocker arm 40. For example, the leap block mount 50 comprises: a block rotation portion 52 coupled to the other end of the blocker arm 40 so as to be rotatable up and down; a block rotation shaft 54, one end of which is fixedly coupled to the block rotation portion 52 and which extends through the blocker arm 40; and a leap block mount guide 56 coupled to and spaced by a predetermined distance (i.e., offset) from the center of the other end of the block rotation shaft 54, and configured to be inserted into the leap block mount guide groove 34 of the drive cam 30 so as to move along the leap block mount guide groove 34. Since the block rotation portion 52 and the block rotation shaft 54 are coupled to the blocker arm 40, they move slidably up and down and rotate left and right with respect to the drive cam 30 in the same way as the blocker arm 40; however, because the leap block mount guide 56 moves along the leap block mount guide groove 34 of the drive cam 30, the position thereof changes in accordance with the shape of the leap block mount guide groove 34, and accordingly, the block rotation portion 52 and the block rotation shaft 54 rotate.

Figure 6:
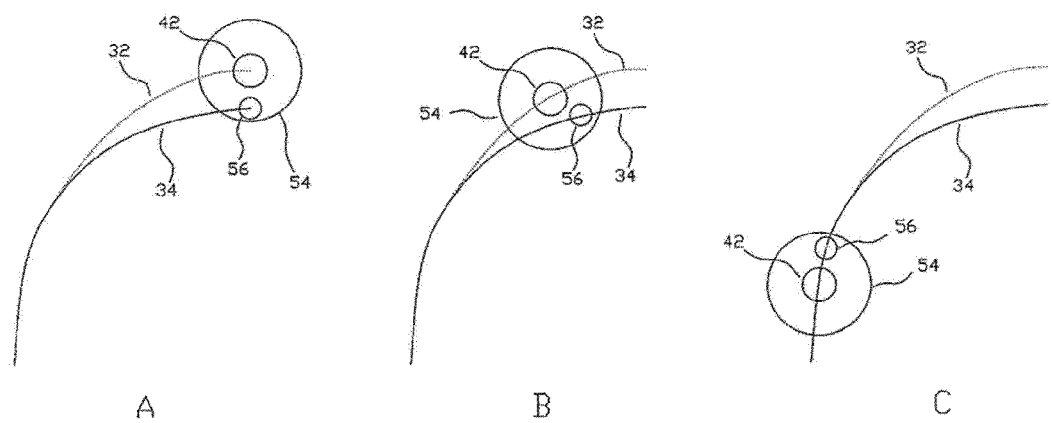
FIG. 6 is a view showing trajectories of a blocker arm guide groove 32 and a leap block mount guide groove 34 formed in a drive cam 30, and relative positions of a blocker arm guide 42 and a leap block mount guide 56 and a rotational state of a block rotation shaft 54, when a blocker arm 40 and a leap blocker mount 50 move, respectively, along these trajectories, in a lens blocker in accordance with the present invention.

FIG. 6 is a view showing trajectories of the blocker arm guide groove 32 and the leap block mount guide groove 34 formed in the drive cam 30, and relative positions of the blocker arm guide 42 and the leap block mount guide 56 and the rotational state of the block rotation shaft 54, when the blocker arm 40 and the leap blocker mount 50 move, respectively, along these trajectories. Since the blocker arm 40 and the leap block mount 50 move up and down and rotate left and right along the same trajectories relative to the drive cam 30, the relative positions of the blocker arm guide 42 and the leap block mount guide 56 change according to the difference in the trajectories of the blocker arm guide groove 32 and the leap block mount guide groove 34. As shown in FIG. 5 and (A) of FIG. 6, at the initial position a where the leap block is mounted on the leap block mount 50, the blocker arm guide 42 and the block rotation shaft 54 are at the same height, and since the trajectory of the leap block mount guide groove 34 is located below the trajectory of the blocker arm guide groove 32, the leap block mount guide 56 is offset downward from the center of the block rotation shaft 54 (see (A) of FIG. 6). Thereafter, when the difference in the trajectories of the blocker arm guide groove 32 and the leap block mount guide groove 34 changes, because the blocker arm guide 42 and the block rotation shaft 54 are continuously located at the same height, the relative positions of the center of the block rotation shaft 54 and the leap block mount guide 56 changes, causing the block rotation shaft 54 to rotate. For example, as shown in FIG. 6, if the trajectories of the blocker arm guide groove 32 and the leap block mount guide groove 34 coincide with each other, when the blocker arm 40 and the leap block mount 50 moves downward, the blocker arm guide 42 and the block rotation shaft 54 move downward along the blocker arm guide groove 32 and the leap block mount guide 56 moves along the leap block mount guide groove 34, so that the block rotation shaft 54 and the leap block mount guide 56 connected thereto rotate in the counter-clock wise direction, resulting in the form that the leap block mount guide 56 moves following the movement of the center of the block rotation shaft 54 (see (B) of FIG. 6). Thereafter, when the blocker arm 40 and the leap block mount 50 move vertically downward and stop at the attachment position b where the leap block is attached to the blank lens, the leap block mount guide 56 is positioned above the center of the block rotation shaft 54 (see (C) of FIG. 6). Accordingly, between the initial position (a, (A) of FIG. 6) and the attachment position (b, (C) of FIG. 6), the leap block mount guide 56, the block rotation shaft 54, and the block rotation portion 52 rotate from below to above, for example 180 degrees.

As shown in FIG. 6, it is preferable that the trajectory of the leap block mount guide groove 34 is located higher than the initial trajectory position al of the leap block mount guide groove 34 and then moves down to the attachment position b, within the limit in which the leap block mount guide 56 moves while rotating following the movement of the center of the block rotation shaft 54. If the initial trajectory position al of the leap block mount guide groove 34 is formed to be low as described above, it is possible to restrain the leap block mount 50 from rotating in the reverse direction (the leap block mount guide 56 is positioned below the center of the block rotation shaft 54) so as to rotate in the forward direction (the leap block mount guide 56 is positioned above the center of the block rotation shaft 54, see (C) of FIG. 6) when the blocker arm 40 moves down. In addition, when the leap block is mounted on the leap block mount 50 at the initial position al, force is applied to the leap block mount guide 56 in the downward direction, and at this time, the leap block mount guide 56 is fixed at the initial position al located lower than the trajectory of the leap block mount guide groove 34 and can be prevented from moving to the attachment position b along the trajectory of the leap block mount guide groove 34. When the center of the block rotation shaft 54 is moved along the trajectory of the blocker arm guide groove 32 after the leap block is mounted, the leap block mount guide 56 moves over the convex trajectory above the leap block mount guide groove 34 and rotates while moving downward.

Therefore, the leap block mount 50 is positioned toward the upward direction at the initial position a, that is, at the position where the leap block is mounted on the leap block mount 50, and the leap block mount 50 is positioned toward the downward direction at the attachment position b, that is, at the position where the leap block is attached to the blank lens. Accordingly, the user can easily mount the leap block to the leap block mount 50 while visually checking the leap block mount 50 positioned toward the upward direction with his or her own eyes at the initial position a. Here, the upward direction and the downward direction do not necessarily have to be 180 degrees from each other, and it is sufficient as long as the leap block mount 50 is rotated to the upward direction so that the leap block can be mounted easily.

Embodiments

Referring back to FIG. 5, the blocker arm base 60 is a means for moving the blocker arm 40 and the leap block mount 50 up and down along the drive cam 30, and may be a drive means mounted on the drive cam 30 so as to be slidably movable and supporting upper and lower portions of the blocker arm 40. More preferably, one end of the blocker arm base 60 is provided with a drive handle that a user can grasp and move up and down. The user can push down the drive handle 62 to move the blocker arm base 60 down, thereby causing the blocker arm 40 to move down, or can push up the drive handle 62 to cause the blocker arm 40 to move up. Furthermore, an elastic member (not shown) such as a spring or the like may be mounted on the blocker arm base 60, such that if no external force is applied to the blocker arm base 60, the blocker arm 40 is caused to be located at the initial position (raised position), and only when the user applies force to lower the blocker arm base 60 and the drive handle 62, the blocker arm 40 is caused to move down.

Figure 7:
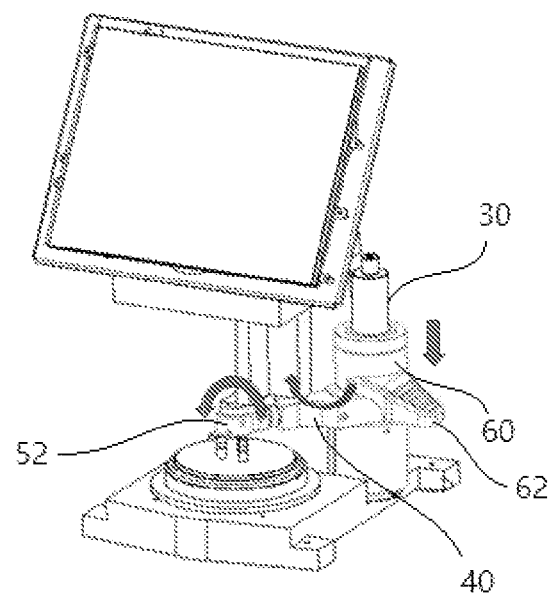
FIG. 7 is a view showing an operation of a lens blocker in accordance with the present invention.

FIG. 7 is a view showing the operation of the lens blocker in accordance with the present invention. In the following, the operation of the lens blocker in accordance with the present invention will be described with reference to FIGS. 3 to 7. As shown in FIG. 3, the leap block is first mounted from the upper direction on the leap block mount 50 at the initial position a oriented in the upper direction, and the blank lens is placed on the lens mount 70. Next, when the drive handle 62 formed at one end of the blocker arm base 60 is moved from the initial position (a, upper position) to the attachment position (b, lower position), the leap block mount 50 is rotated vertically from the upward direction to the downward direction, and the blocker arm 40 simultaneously rotates laterally toward the blank lens while moving down, so as to move to the attachment position for the leap block above the blank lens (see FIG. 7). If the drive handle 62 is further pushed down in this state, the leap block mounted on the leap block mount 50 is attached to the blank lens. Thereafter, when the drive handle 62 is returned to the initial position a, the leap block mount 50 rotates back from the downward direction to the upward direction, such that the blocker arm 40 rotates away from the blank lens while moving up to return to the initial state.

Therefore, according to the present invention, it is possible to mount the leap block while visually checking the attachment state of the leap block with one's own eyes when mounting the leap block on the leap block mount 50, and to accurately attach the leap block to the blank lens by lowering and laterally rotating the blocker arm 40 with a single operation of pushing down the drive handle 62, and by simultaneously rotating vertically the leap block mount 50. According to the present invention, it is possible to improve the convenience of an operation of attaching the leap block, and to prevent a mounting failure or operation failure resulting from a user's carelessness or mistakes.

The invention claimed is:
1. A lens blocker comprising:
a drive cam (30) of a cylindrical shape having a blocker arm guide groove (32) formed therein;
a blocker arm (40) coupled to the drive cam (30) to be movable up and down along the drive cam (30) and to be rotatable about the drive cam (30), and having a blocker arm guide (42) formed at one end thereof, wherein the blocker arm guide (42) is inserted into the blocker arm guide groove (32) of the drive cam 30 and moves along the blocker arm guide groove (32), so as to cause the blocker arm (40) to move up and down along the drive cam (30) and to rotate about the drive cam (30);

a leap block mount (50), to which a leap block to be attached to a blank lens is mounted and which is coupled to the blocker arm (40);

a blocker arm base (60) configured to move the blocker arm (40) up and down along the drive cam (30) and to rotate the blocker arm (40) about the drive cam (30); and a lens mount (70) onto which the blank lens, to which the leap block is to be attached, is mounted, wherein the drive cam (30) further comprises a leap block mount guide groove (34) formed therein, and wherein the leap block mount (50) comprises: a block rotation portion (52) on which the leap block to be attached to the blank lens is mounted and which is coupled to the other end of the blocker arm (40) so as to be rotatable from an upward facing position to a downward facing position and vice versa; a block rotation shaft (54), one end of which is fixedly coupled to the block rotation portion (52) and which extends through the blocker arm (40); and a leap block mount guide (56) coupled to and spaced by a predetermined distance from the center of the other end of the block rotation shaft (54), and configured to be inserted into the leap block mount guide groove (34) of the drive cam (30) so as to move along the leap block mount guide groove (34).

2. The lens blocker of claim 1, wherein the blocker arm guide groove (32) is formed on one side of the drive cam (30), in the shape of a circular arc having a height (h1), a width (w1), and a curvature (r1) that are predetermined.

3. The lens blocker of claim 1, wherein at an initial position (a) where the leap block is mounted to the leap block mount (50), a trajectory of the leap block mount guide groove (34) is located below a trajectory of the blocker arm guide groove (32), and relative trajectories of the blocker arm guide groove (32) and the leap block guide groove (34) coincide with each other.

4. The lens blocker of claim 1, wherein at an initial position (a) where the leap block is mounted to the leap block mount (50) and an attachment position where the leap block is attached to the blank lens, the leap block mount (50) rotates from the downward facing position to the upward facing position.

5. The lens blocker of claim 1, wherein the blocker arm base (60) is mounted on the drive cam (30) so as to be slidably movable and supports upper and lower portions of the blocker arm (40).

* * * * *